United States Patent Office 3,197,040
Patented July 27, 1965

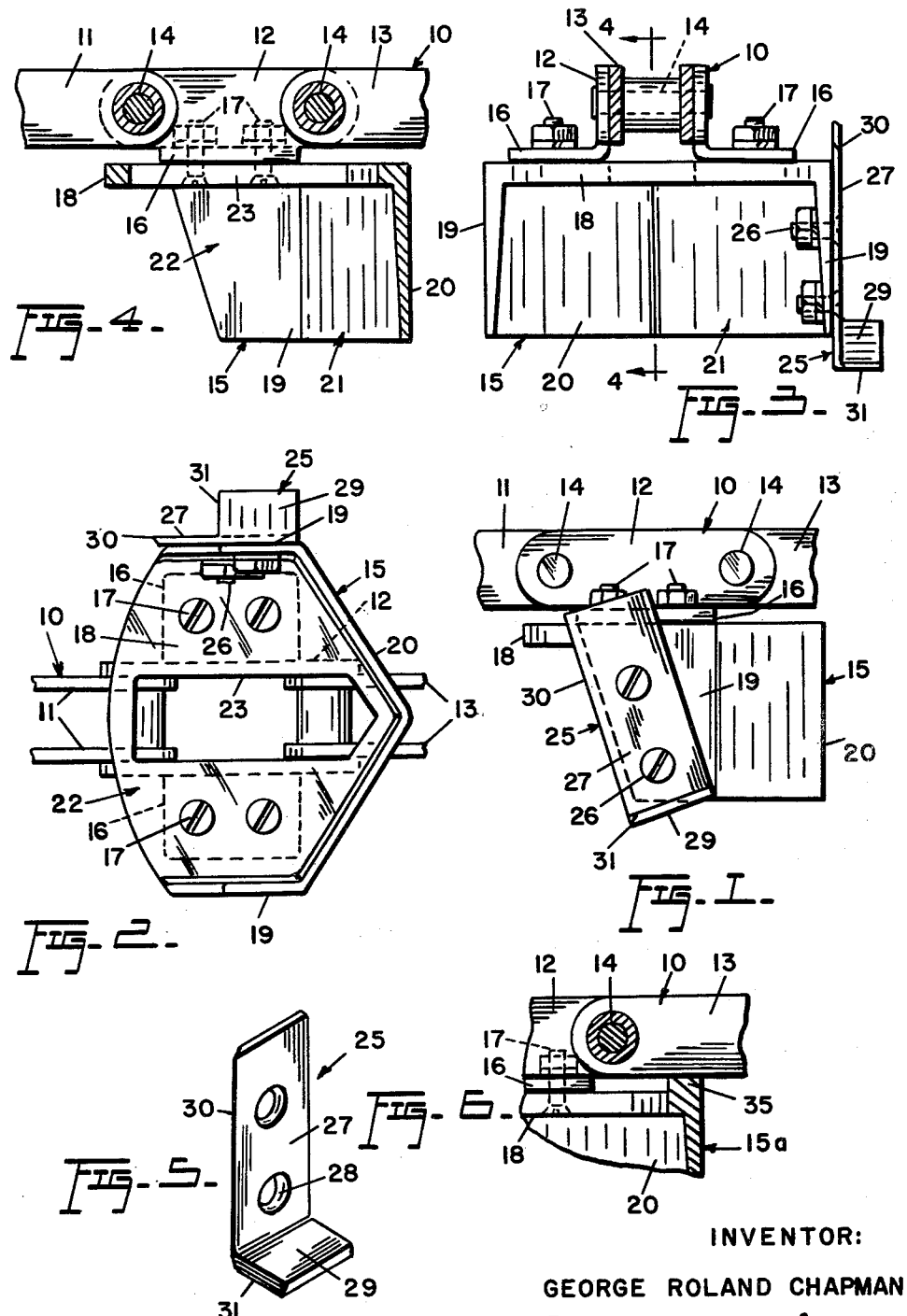

3,197,040
SILAGE HANDLING MACHINES
George Roland Chapman, Stafford Road, Palmyra, N.Y.
Filed Aug. 22, 1963, Ser. No. 303,883
11 Claims. (Cl. 214—17)

This invention relates to new and useful improvements in silage handling machines of the general type disclosed in my earlier Patents No. 2,788,247 dated Apr. 9, 1957 and No. 2,978,121 dated Apr. 4, 1961.

The silage handling machines in the above mentioned patents utilize a conveyor chain with slats or lugs thereon for propelling the silage which is to be discharged or unloaded from a silo. Quite often, the silage in the silo becomes a well packed, interwoven mass, and some difficulty is experienced in loosening the same so that it may be properly and efficiently picked up and propelled by the slats or lugs of the conveyor chain.

It is, therefore, the principal object of this invention to eliminate this difficulty, this object being attained by the provision of cutters which move with the conveyor chain and effectively loosen and break up the silage, so that the conveyor chain is capable of propelling the same in an efficient manner.

More specifically, the invention utilizes a conveyor chain with silage scoops thereon and cutters mounted on sides of the scoops, so that when the chain is in motion, the silage is loosened, broken up, cut, or otherwise disintegrated by the cutters and is left free to be propelled by the scoops of the conveyor.

Other objects, features and advantages of the invention will become apparent from the following description taken in conjunction with the accompanying drawings, wherein like characters of reference are used to designate like parts, and wherein:

FIGURE 1 is a fragmentary side elevational view of the conveyor chain equipped with the silage scoop and cutter of the invention;

FIGURE 2 is an underside plan view thereof;

FIGURE 3 is a front elevational view;

FIGURE 4 is a fragmentary longitudinal sectional view, taken substantially in the plane of the line 4—4 in FIGURE 3;

FIGURE 5 is a perspective view of the cutter per se; and

FIGURE 6 is a fragmentary sectional view, similar to that shown in FIGURE 4, but illustrating a slightly modified embodiment of the scoop.

Referring now to the accompanying drawings in detail, the general reference numeral 10 designates a conveyor chain of a silage handling machine of the general type disclosed in my aforementioned patents, the chain comprising a plurality of links 11, 12, 13, having overlapped end portions connected together by pivot means including transverse pins 14, in accordance with conventional practice.

As is customary, each of the chain links consists of a pair of transversely spaced link members, as will be clearly apparent. A plurality of silage scoops are secured at longitudinally spaced points to the chain 10, one such scoop 15 being shown as secured to the link members of the chain link 12. For this purpose, the members of the link 12 are provided with laterally outwardly projecting, apertured flanges 16, to which the scoop is fastened by suitable bolts 17. As will be understood, the scoop is in an inverted position and depends from the conveyor chain, so that it is capable of picking up and propelling the silage as the machine rests on top of the silage and the conveyor chain is driven. Thus, the scoop 15 has a top wall 18 through which the fastening bolts 17 are extended, a pair of side walls 19, a V-shaped back wall 20, and it also has an open bottom 21 and an open front 22 which faces the direction of travel of the chain. The top wall 18 of the scoop is preferably provided with an elongated opening 23 for lightness of weight of the scoop as well as to promote a certain amount of self-cleaning action of the scoop when silage is emptied therefrom.

The essence of the invention resides in the provision of a silage cutter 25 which is mounted by suitable bolts 26 on the outside of one of the side walls 19 of the scoop. The cutter 25 includes a vertical knife portion 27, that is, a knife portion disposed in a vertical plane against the scoop side wall and formed with apertures 28 to receive the bolts 26. The cutter also includes a transverse knife portion or wing 29 which projects laterally outwardly from the lower end of the vertical portion 27. As shown in FIGURE 1, the cutter 25 is attached to the scoop side wall in a forwardly inclined manner and the front edge of the vertical portion 27 is bevelled to form a cutting edge 30 which is disposed forwardly of the open front 22 of the scoop, that is, forwardly of the front edge of the scoop side wall, so that the edge 30 may cut and loosen silage in advance of the scoop. Also, the transverse knife portion 29 has a bevelled front edge forming a cutting edge 31 which is located below the open bottom 21 of the scoop so that the silage is cut and loosened below the scoop as well. Moreover, the transverse knife portion 29 is disposed obliquely or at a rearward inclination as shown, so that the cut and loosened silage is agitated and loosened further by the passage of the knife portion 29 therethrough, and it will be also noted that by virtue of its transverse disposition, the knife portion 29 will effectively cut vertical stems of the silage, which otherwise would not be encountered by the vertical knife portion 27.

As is best shown in FIGURE 1, the cutter 25 is mounted on the side wall of the scoop 15 so that it is disposed between the ends of the link 12 of the conveyor chain 10, that is, between the pivot means 14 of the link, whereby the cutter is substantially stabilized in its operation. The slightly modified arrangement of the scoop 15a shown in FIGURE 6 is provided with an integral boss or block 35 on top of the top wall of the scoop, which boss abuts the next following link 13 of the chain and thus assists in stabilizing the scoop and the associated cutter in its operation.

While in the foregoing there have been described and shown the preferred embodiments of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. In a silage handling machine, the combination of a conveyor chain, a silage scoop secured to said chain, said scoop having a pair of side walls and an open front facing the direction of travel of the chain, and a silage cutter secured exteriorly to one of the side walls of said scoop, said cutter including a vertical knife portion contiguous with the outer surface of said one side wall and a transverse wing projecting laterally outwardly from said vertical portion.

2. The device as defined in claim 1 wherein said transverse wing of said cutter is inclined rearwardly in the direction of travel of said chain.

3. In a silage handling machine, the combination of a conveyor chain, a silage scoop secured to and depending from said chain, said scoop having a pair of side walls, an open bottom and an open front facing the direction of travel of the chain, and a silage cutter secured exteriorly to one of said side walls of said scoop, said cutter including a vertical knife portion contiguous with the outer surface of said one side wall and a transverse knife wing projecting laterally outwardly from the lower end of said vertical knife portion, said transverse knife wing being inclined rearwardly in the direction of travel of said chain.

4. The device as defined in claim 3 wherein said transverse knife wing has a cutting edge disposed in a plane below the open bottom of said scoop.

5. The device as defined in claim 3 wherein said vertical knife portion has a cutting edge disposed forwardly of the open front of said scoop.

6. A silage scoop adapted to be secured to a conveyor chain of a silage handling machine, said scoop having a pair of side walls and an open front, and a silage cutter secured exteriorly to one of said side walls, said cutter including a vertical knife portion contiguous with the outer surface of said one side wall and a transverse knife wing projecting laterally outwardly from said vertical portion.

7. The device as defined in claim 6 wherein said scoop has an open bottom, said transverse knife wing having a cutting edge disposed in a plane below said open bottom, and said vertical knife portion having a cutting edge disposed forwardly of the open front of said scoop.

8. In a silage handling machine, the combination of a conveyor chain, a silage scoop secured to said chain, said scoop having a pair of side walls and an open front facing the direction of travel of the chain, and a silage cutter blade secured exteriorly to one of the side walls of said scoop contiguous with the outer surface of said one side wall, said blade being disposed in a plane parallel to the direction of travel of said chain and having a front cutting edge disposed forwardly of the open front of the scoop.

9. In a silage handling machine, the combination of a conveyor chain, an inverted silage scoop secured to and depending from said chain, said scoop having an open front facing the direction of travel of the chain and a pair of side walls with downwardly and rearwardly slanting front edges, and a silage cutter secured exteriorly to one of said side walls of said scoop, said cutter including a blade portion disposed in a vertical plane contiguous with the outer surface of said one side wall, said blade portion having a front cutting edge located forwardly of the open front of the scoop and slanted downwardly and rearwardly in parallel with the front edge of the associated side wall.

10. The device as defined in claim 9 wherein said cutter also includes a transverse wing projecting laterally outwardly from the lower end of said blade portion, said wing being inclined rearwardly in the direction of travel of said chain and having a front cutting edge disposed in a plane below the bottom of said scoop.

11. A silage scoop adapted to be secured to a conveyor chain of a silage handling machine, said scoop having an open front with an open bottom and a pair of side walls with downwardly and rearwardly slanting front edges, and a silage cutter secured exteriorly to one of said side walls of said scoop, said cutter including a blade portion disposed in a vertical plane contiguous with the outer surface of said one side wall, said blade portion having a front cutting edge located forwardly of the open front of the scoop and slanted rearwardly and downwardly in parallel with the front edge of the associated side wall, said cutter also including a transverse wing portion projecting laterally outwardly from the lower end of said blade portion, said wing portion being rearwardly inclined and having a front cutting edge located in a plane below the open bottom of the scoop.

References Cited by the Examiner

UNITED STATES PATENTS

| | | | |
|---|---|---|---|
| 866,519 | 9/07 | Rhodes et al. | 198—174 X |
| 1,265,131 | 5/18 | Stamp | 198—174 X |
| 2,480,656 | 8/49 | Jenne. | |
| 3,057,608 | 10/62 | Patz et al. | 214—17 |

HUGO O. SCHULZ, *Primary Examiner.*